US009516491B2

(12) United States Patent
Lihosit et al.

(10) Patent No.: US 9,516,491 B2
(45) Date of Patent: Dec. 6, 2016

(54) REMOTE DEVICE MODIFICATION (71) Applicant: T-Mobile U.S.A., Inc., Bellevue, WA (US)

(72) Inventors: Christopher August Lihosit, Seattle, WA (US); Tyler Blair Axdorff, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/791,221

(22) Filed: Jul. 2, 2015

(65) Prior Publication Data
US 2016/0255493 A1    Sep. 1, 2016

Related U.S. Application Data (60) Provisional application No. 62/126,371, filed on Feb. 27, 2015.

(51) Int. Cl.
H04M 3/00      (2006.01)
H04W 8/18      (2009.01)
H04W 12/06     (2009.01)

(52) U.S. Cl.
CPC ............. H04W 8/183 (2013.01); H04W 12/06 (2013.01)

(58) Field of Classification Search
CPC .......................... H04W 8/183; H04W 12/06
See application file for complete search history.

(56) References Cited

U.S. PATENT DOCUMENTS

| | | | |
|---|---|---|---|
| 8,185,097 B2 | 5/2012 | Vanderlinden et al. | |
| 8,666,383 B1 | 3/2014 | Mauer et al. | |
| 8,707,288 B2* | 4/2014 | Roseborough | G06F 8/65 717/168 |
| 8,781,457 B2 | 7/2014 | Randazzo et al. | |
| 8,825,753 B2* | 9/2014 | Kaleem | H04N 21/26291 709/203 |
| 9,042,877 B1* | 5/2015 | Ghoshal | H04W 8/245 455/418 |
| 2006/0160529 A1* | 7/2006 | Glass | G06F 8/61 455/418 |
| 2008/0220743 A1* | 9/2008 | Mora | H04W 8/205 455/411 |
| 2009/0119773 A1* | 5/2009 | D'Amore | G06F 9/5011 726/21 |
| 2009/0181662 A1* | 7/2009 | Fleischman | H04W 4/001 455/419 |
| 2009/0247124 A1 | 10/2009 | De Atley et al. | |
| 2010/0222047 A1* | 9/2010 | Vanderlinden | H04W 8/245 455/418 |

(Continued)

OTHER PUBLICATIONS

"Google Nexus 6 Releases on T-Mobile with No Frills." Nov. 25, 2014. <www.latinpost.com/home/news/services/print.php?article_id=26473>. 1 page.

(Continued)

*Primary Examiner* — Kenneth Lam
(74) *Attorney, Agent, or Firm* — Perkins Coie LLP (57) ABSTRACT

Systems and methods for remote device customization and modification are provided. Various embodiments remove the need for a carrier to source multiple types of the same user equipment. In some embodiments, the user equipment can be customized upon activation using network communications. Historically, a carrier might have a variant of a phone for each mobile virtual network operator. However, management of the inventory and custom builds can be difficult and expensive. Some embodiments provide for a single global SKU and a single blank-slate device from an original equipment manufacturer. Carrier detection can be used when the phone is activated to create customized phone settings. For example, the look and feel can be updated to match preferences of a carrier (e.g., wallpaper, ringtones, default apps, etc.), corporate client, family, or another specified group of users.

19 Claims, 8 Drawing Sheets

(56) References Cited

U.S. PATENT DOCUMENTS

| | | | | |
|---|---|---|---|---|
| 2013/0111461 | A1* | 5/2013 | Zubas | G06F 8/665 717/173 |
| 2013/0137417 | A1 | 5/2013 | Urbanek | |
| 2014/0098671 | A1* | 4/2014 | Raleigh | H04M 15/80 370/235 |
| 2014/0213233 | A1* | 7/2014 | Parry | H04W 24/02 455/418 |
| 2014/0228012 | A1 | 8/2014 | Annan et al. | |

OTHER PUBLICATIONS

"T-Mobile clarifies that its Nexus 6 is free from bloatware and carrier branding." Nov. 24, 2014. <thedroidguy.com2014/11/t-mobile-clarifies-that-its-nexus-6-is-free-from-bloatware-and-carrier-branding-99946#2GCtKdsBDbyq04Lo.97> 1 page.

MobileIron. <www.mobileiron.com/en> accessed Jul. 2, 2015, 3 pages.

Symantec Corporation. "Business Challenge: Mobile Device Management." <www.symantec.com/mobile-device-management/> accessed Jul. 2, 2015, 1 page.

TmoNews The Unofficial T-Mobile Blog, "Unlike its competitors, T-Mobile keeps the Nexus 6 unbranded." Nov. 24, 2014. <www.tmonews.com/2014/11/unlike-its-competitors-t-mobile-keeps-the-nexus-6-unbranded/>. 2 pages.

Wikipedia. "Mobile device management." <en.wikipedia.org/wiki/Mobile_device_management> accessed Jul. 2, 2015, 6 pages.

Wikipedia. "Over-the-air programming." <en.wikipedia.org/wiki/Over-the-air_programming> accessed Jul. 2, 2015, 3 pages.

International Searching Authority, International Search Report and Written Opinion, PCT Application PCT/US2016/019661, mailed Jun. 17, 2016, 13 pages.

\* cited by examiner

REMOTE DEVICE MODIFICATION

CROSS-REFERENCE TO RELATED APPLICATIONS

This application claims priority to U.S. Provisional Application Ser. No. 62/126,371 filed Feb. 27, 2015, which is incorporated herein by reference in its entirety for all purposes.

BACKGROUND

Modern mobile electronic devices (such as mobile phones, personal digital assistants, computer tablets, or the like) have become a common part of modern life. These devices increasingly provide advanced computing capabilities along with a variety of other features and options that improve the user's experience with the device. Some common examples of the features and options include cameras, Wi-Fi, SMS and MMS messaging, web browsers, voice/video calling, and GPS capabilities. In addition to these common features and options, modern electronic devices often include operating systems that can run software applications on one or more processors. The software applications can be installed (e.g., by the manufacture, mobile carrier, or by the user) on these devices to perform a variety of specific tasks and/or extend the functionality of the devices.

The software applications may use many of the hardware and other software components of the mobile devices. As the demands and functionality of the software applications increase, so does the frequency of use for these components. Not only are the demands and functionality increasing, but the mobile devices are becoming smaller and the features and applications are competing for various limited resources (e.g., memory). In order to distinguish between similar or identical devices, mobile carriers often customize the devices by providing additional applications and/or locking/unlocking various features. Traditionally, these customizations are flashed onto the devices at the factory and require a second flashing to change. This type of manual updating process can create a variety of inventory problems, among other problems.

BRIEF DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods for remote device support and modification are provided. Various embodiments remove the need for a carrier to source multiple types of the same user equipment by allowing the carrier to provide over-the-air customizations to the user equipment. In some embodiments, the user equipment can be customized upon activation using network communications. Historically, a carrier might have a variant of a phone for each mobile virtual network operator (MVNO, also sometimes known as a mobile virtual network operator enabler (MVNOE)). (A MVNO is a provider of management services and a reseller of network services from other telecommunications suppliers that does not itself own the telecommunication infrastructure.) Management of the inventory and custom builds, however, can be difficult and expensive. As such, MVNO's have been traditionally provided discounts to not request additional customization of the user equipment. When a MVNO accepts these discounts and declines the customizations, a user will often see branding that is different from the MVNO to which they are associated. This can result in confusion for the consumer.

In contrast, some embodiments provide for a single global stock keeping unit (SKU) and a single blank-slate device from an original equipment manufacturer that can be customized over-the-air. Similarly, an unlimited number of SKUs can be set for the same device coming from the OEM and then the devices can be later configured and customized (e.g., upon activation) based on preferences of the carrier, company, group, or user. Carrier detection can be used when the phone is activated to create (or retrieve) customized phone settings. For example, the look and feel can be updated to match preferences of a carrier (e.g., wallpaper, ringtones, default apps, etc.), corporate client, family, other specified group of users, and/or an individual. As a result, fewer custom builds of a mobile device need to be created and managed because, as each device is registered with a network, the aesthetic visual and audio profiles can be installed (or updated) directly from the cloud along with content and/or functionality customization.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to branding a mobile device by customizing aesthetic and functional features/content (e.g., wallpaper, color schemes, sound schemes, applications, videos, etc.) on a mobile device, embodiments of the present technology are equally applicable to various other cloud-based branding, rebranding and customization of electronic devices.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Of course, aspects of the invention may be implemented in pure software.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
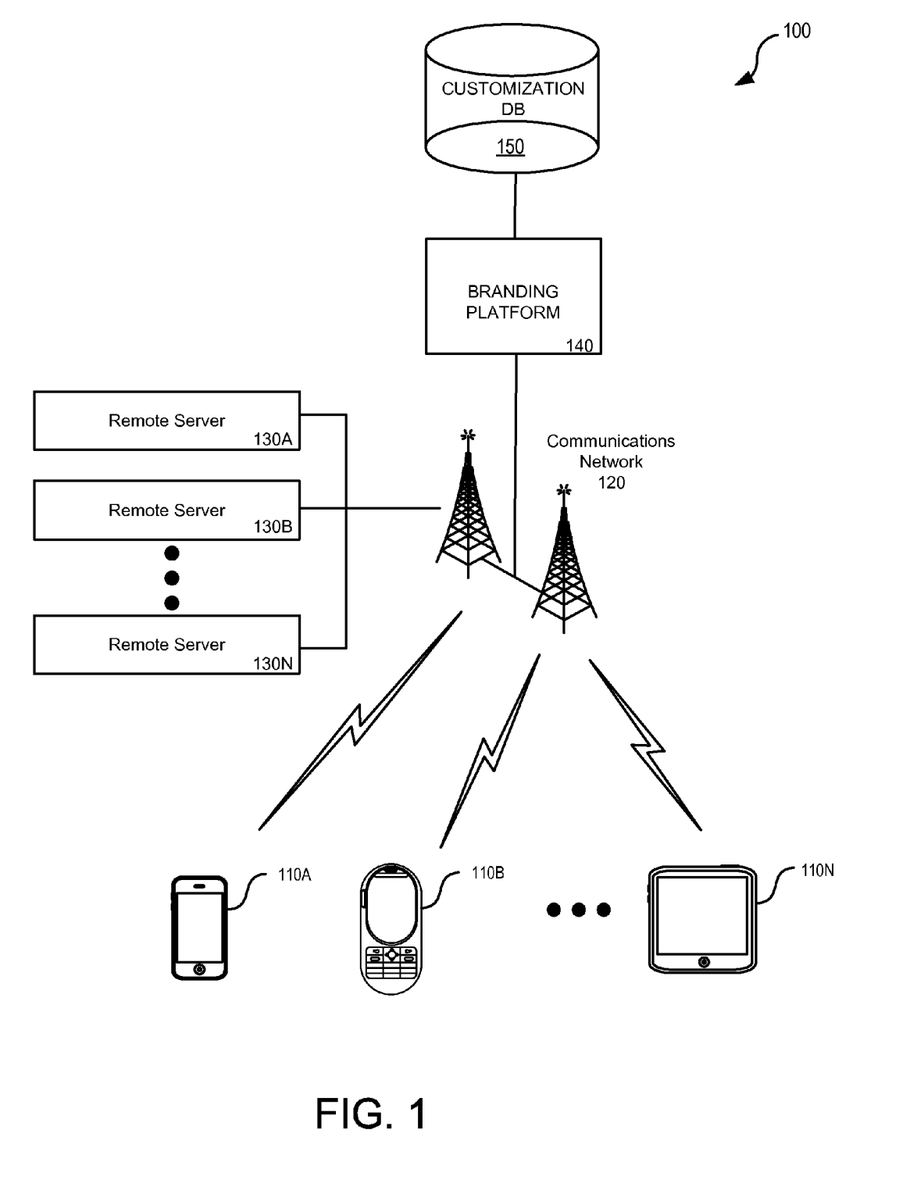
FIG. 1 illustrates an example of a communications environment in which some embodiments of the present technology may be utilized.

FIG. 1 illustrates an example of a communications environment 100 in which some embodiments of the present technology may be utilized. As illustrated in FIG. 1, communications environment 100 may include one or more mobile devices 110A-110N (such as a mobile phone, tablet computer, mobile media device, mobile gaming device, vehicle-based computer, wearable computing device, etc.), communications network 120, remote servers 130A-130N, branding platform 140, and a customization database 150. As described in more detail below in FIG. 3, to allow a user to make use of the various services and features of the mobile device, mobile devices 110A-110N can include various sensors and input/output components.

In addition, mobile devices 110A-110N can include network communication components that enable the mobile devices to communicate with remote servers 130A-130N or other portable electronic devices by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in mobile device 110A-110N to enable network communication. For example, a mobile device may be configured to communicate over a GSM mobile telecommunications network. As a result, the mobile device may include a Subscriber Identity Module (SIM) card that stores an International Mobile Subscriber Identity (IMSI) number that is used to identify the mobile device on the GSM mobile communications network or other networks, for example, those employing 3G and/or 4G wireless protocols. If the mobile device is configured to communicate over another communications network, the mobile device may include other components that enable it to be identified on the other communications networks.

In some embodiments, mobile devices 110A-110N may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN. Mobile devices 110A-110N may include one or more mobile applications that need to transfer data or check-in with remote servers 130A-130N.

Figure 2:
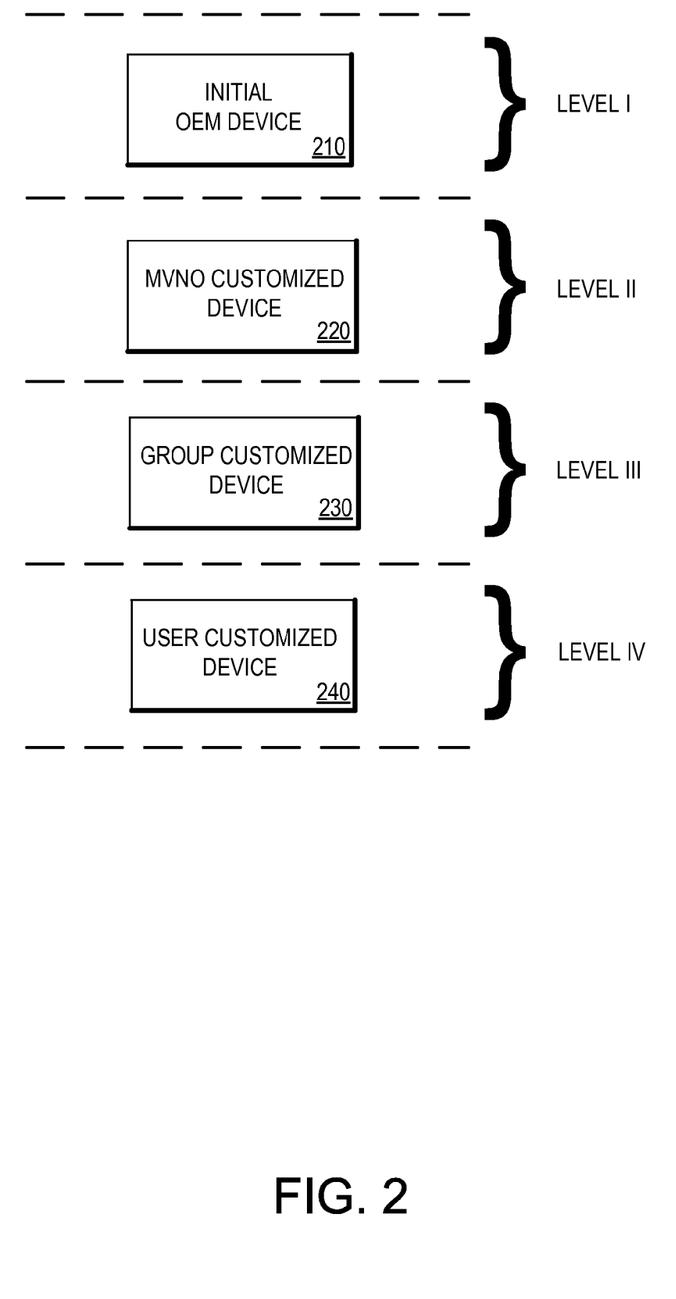
FIG. 2 illustrates a set of customization levels available to a mobile device according to one or more embodiments of the present technology.

In some embodiments, mobile devices 110A-110N may be delivered from a manufacturing facility unbranded and without various software, aesthetic, and/or content customizations. In other embodiments, mobile devices 110A-110N may be delivered with a first default branding profile (e.g., a neutral color scheme without logos, or branded for the highest volume use or most common configuration) which can be updated when the mobile device is first activated. FIG. 2 illustrates a set of customization levels 200 available to a mobile device according to one or more embodiments of the present technology. The customization levels illustrated in FIG. 2 include an OEM customization as a first level, a MVNO customization as a second level, a group customization as a third level, and a user customization as a fourth level.

When first activated by a user (such as over-the-air, or in a retail store), mobile device 110A-110N may generate one or more registration messages which can be transmitted through communications network 120. Some of these messages (or the information contained within) can be used by branding platform 140 to identify a branding profile for the mobile device. This branding profile can be used to brand, rebrand, and otherwise customize the mobile device with a variety of aesthetic visual features (e.g., boot animation, splash screens, background colors, etc.), audio features (e.g., startup sounds, ringtones, etc.), software applications, various device configurations (e.g., access point name, device management settings, etc.) and other types of content (e.g., videos, movies, applications, etc.). In some cases, branding platform 140 may also enable or disable various functionalities that the mobile device hardware and/or software may be able to perform. Branding platform 140 may determine the carrier or mobile virtual network operator associated with the mobile device and customize the mobile device according to profiles defined by that carrier or mobile virtual network operator.

The following table illustrates some of the customizations that may be included in a branding profile.

| Visual Features | Audio Features | Content | Configurations |
|---|---|---|---|
| Boot and shutdown Animation | Startup and shutdown Sounds | Videos | Network Configuration |
| Splash Screens Background Colors | Ringtones Alarm Tones | Music Applications | Device Management Disable Content/ Features (e.g. Camera, Wi-Fi, etc.) |
| Font Schemes | Notification Tones | Pictures | SMS/MMS Configuration |
| Color Schemes | | | LTE/VoLTE/WiFi Calling Servers |
| Widgets | | | |

The initial OEM device 210 may include a generic branding scheme (e.g., generic color and sound schemes) along with basic operating system content. In some instances, initial OEM device 210 may have been branded at the factory with a first branding scheme (e.g., by the carrier). When the device registers with the network, branding platform 140 can customize the device based on a MVNO branding profile to create customized device 220. As a result, little or no customization needs to be flashed on the device at the factory. Instead, any content needed for the customization can be downloaded from branding platform 140 or other source (e.g., SIM, local computer, etc.). As one example, the material (e.g., applications) and the branding profile may be stored on a SIM. As such, when the device is first turned on with the SIM in place, the customization of the aesthetic, audio, and content customizations (e.g., the installation and removal of applications, color schemes, sound schemes, etc.) from devices sold by various carriers or brands based on a single SKU can be customized using the information stored on a SIM.

Further, the branding can be more readily changed by the service provider, since it need not be provided to a manufacturer. So, a service provider could change branding "on-the-fly" to thereby take advantage of a current trend and provide a branded phone associated with, e.g., a currently winning sports team, seasonal themes, and the like. The branding scheme may be temporary and, in some embodiments, indicate a time frame (e.g., two days, one week, one month, etc.) that the branding should revert to, or be updated to, another branding scheme. In some embodiments, a variety of fee structures could be set in place by the branding platform. As such, a subscriber may have to pay a fee from some of the branding schemes.

In some embodiments, the branding and features of the phone may change based on location. For example, when a phone roams to a different state, the brand may be updated to that of a local carrier and with a local number, sports team, or the like. As another example, If the phone goes to another country, the default language may change (e.g., from English to Russian) or a translation application may be automatically installed along with local maps, and the like.

In some embodiments, additional customizations beyond those requested by the carrier or MVNO may be available to the user. For example, user group customizations and individual customizations may be available. A user group can be used to create a group customized device 230 (e.g., company, sport-team related or family customizations). For example, in the family customizations, the primary account holder may be the one that controls the group. Similarly, a particular account holder or an administrator can be responsible for configuring the group customizations (e.g., of a company, governmental body, etc.)

In addition, the mobile device can be further customized, in some embodiments, based on user preferences or needs to create a user customized device 240 (e.g., setting a desired text and icon size, placement of icons, etc.). The various profiles needed to identify the customizations may be stored in customization database 150. In some embodiments, for example, the profiles may be relate to various games, applications, and/or associated settings.

Customization database 150 can be populated in a variety of ways. For example, when a customer buys a mobile device at a store the customer may indicate their affiliation with a company (e.g., by showing a badge or providing a company code). Using this information, the mobile device can be linked to the company (e.g., by recording the IMEI, IMSI, or other unique phone ID) in database 150 so that when the phone is activated, branding platform 140 can match the mobile device ID to the brands that should be installed on the phone. The following table illustrates examples of a data structure that may be used to communicate, store, and identify, the customizations for a mobile device.

| Device ID (e.g., Phone Number, IMEI, etc.) | Subscriber Name | Brand Set |
|---|---|---|
| (202)555-0100 | Jill Petty | Default 210: <Null> MVNO 220: MetroPCS Group 230: Company A Brand User 240: <Null> |
| 01 234567 890123 4 | Jack Little | Default 210: T-Mobile MVNO 220: MetroPCS Group 230: Company B Brand, Sports Team A User 240: Little Family |
| 01 234567 778901 2 | Jane Doe | Default 210: Generic MVNO 220: MetroPCS Group 230: <Null> User 240: <Null> |

In some embodiments, the mobile device may be a pre-paid subscription device. Many carriers subsidize these pre-paid subscription devices since the users will typically purchase additional minutes or data for accessing a cellular network. These additional purchases justify the lower cost and subsidization of the initial sell of the pre-paid subscription devices as the carriers will be able to recoup the initial loss (e.g., after three or four additional purchases of cellular minutes). However, some users purchase these pre-paid subscription devices but never purchase additional cellular minutes. Instead, these users use the device as a Wi-Fi only device (e.g., as a cheap tablet alternative).

Some embodiments allow the carrier to disable (or restrict) the Wi-Fi or other hardware/software capabilities if additional minutes are not purchased (e.g., after a certain amount of time, after expiration or use of minutes/data, etc.). Similarly, the Wi-Fi may only be disabled if the user has not purchased a minimum number of additional minutes or data. For example, once the user has purchased five sets of additional minutes or data, the Wi-Fi capabilities may never be deactivated even if the user does not purchase additional minutes or data.

This may be accomplished in a variety of different manners. For example, the functionality of the Wi-Fi, camera, and/or other features may be tied to a current subscription plan. If a current subscription plan is not detected, then the features may be disabled (e.g., immediately or after some grace period such as one week) as part of a carrier customization of the device. As another example, the device may have to authenticate or reregister with the carrier or branding platform (e.g., periodic, on-demand, set schedule, etc.). This may be accomplished with an automatic device reboot. During the device reboot, the audio may be turned off so as not to disturb the user. When the device authenticates with the carrier or branding platform a determination can be made as to whether certain features should be disabled or enabled. The automatic reboot may check to see the current status of the mobile device (e.g., plugged-in for a long period of time, active data, active voice sessions, background processes, etc.) to decide whether an automatic reboot can happen. If the mobile device is not eligible for a current reboot due to the current status of the device, then the reboot can be skipped or rescheduled. The automatic reboot feature may have other advantages such as clearing random threads, kills the tower session and reestablishes a new session, and the like.

Figure 3:
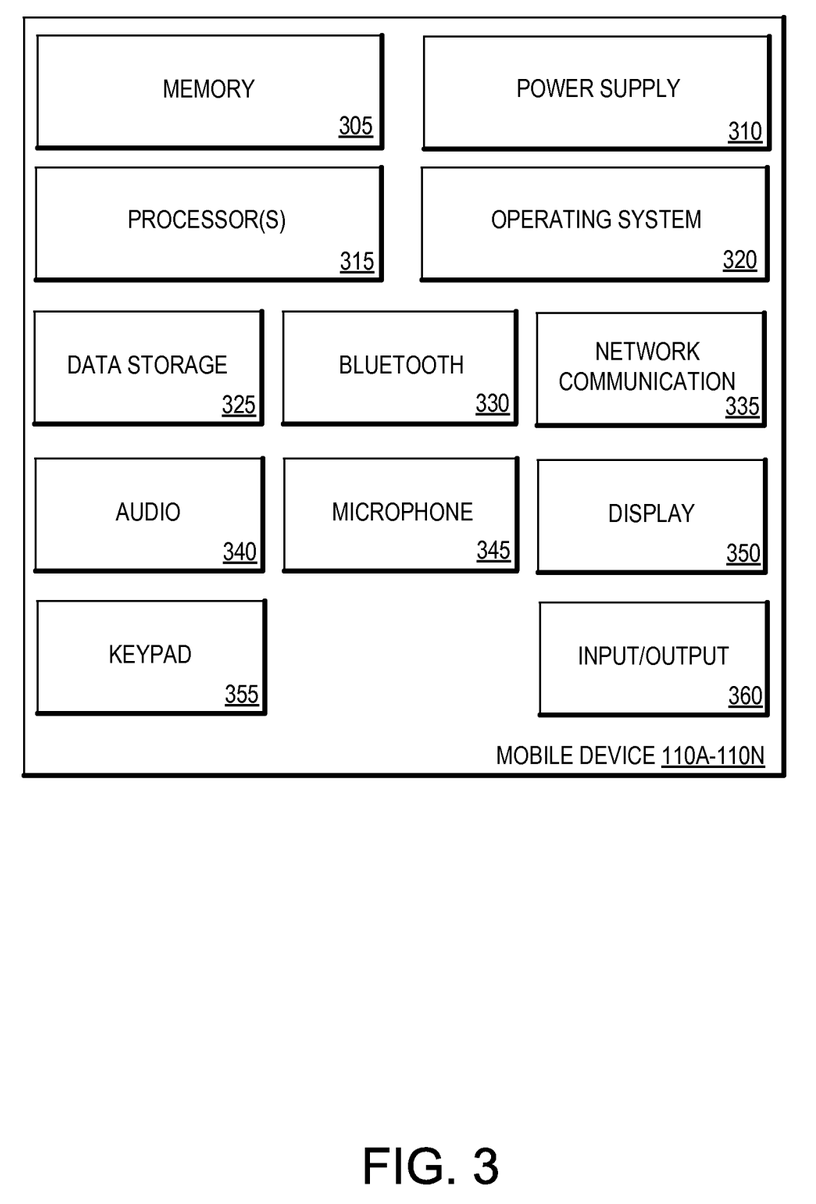
FIG. 3 illustrates a set of components within a mobile device according to one or more embodiments of the present technology.

FIG. 3 illustrates a set of components within mobile device 110A-110N according to one or more embodiments of the present technology. As shown in FIG. 3, mobile device 110A-110N may include memory 305 (e.g., volatile memory and/or nonvolatile memory), power supply 310 (e.g., battery), processor(s) 315 for executing processing instructions, and operating system 320. Additional components such as data storage component 325 (e.g., hard drive, flash memory, memory card, etc.), one or more network interfaces (e.g., Bluetooth Interface 330; and Network Communication Interface 335, which enables the mobile phone to communicate by transmitting and receiving wireless signals using licensed, semi-licensed or unlicensed spectrum over a telecommunications network), audio interface 340, microphone 345, display 350, keypad or keyboard 355, and other input and/or output interfaces 360. The various components of a mobile device may be interconnected via a bus.

Processor(s) 315 are the main processors of mobile device 110A-110N which may include application processors, baseband processors, various coprocessors, and other dedicated processors for operating mobile device 110A-110N. For example, an application processor can provide the processing power to support software applications, memory management, graphics processing, and multimedia. An application processor may be communicably coupled with memory 305 and configured to run the operating system, the user interface, and the applications stored on memory 305 or data storage component 325. A baseband processor may be configured to perform signal processing and implement/manage real-time radio transmission operations of mobile device 110. These processors along with the other components may be powered by power supply 310. The volatile and nonvolatile memories found in various embodiments may include storage media for storing information such as processor-readable instructions, data structures, program modules, or other data. Some examples of information that may be stored include basic input/output systems (BIOS), operating systems, and applications.

Figure 4:
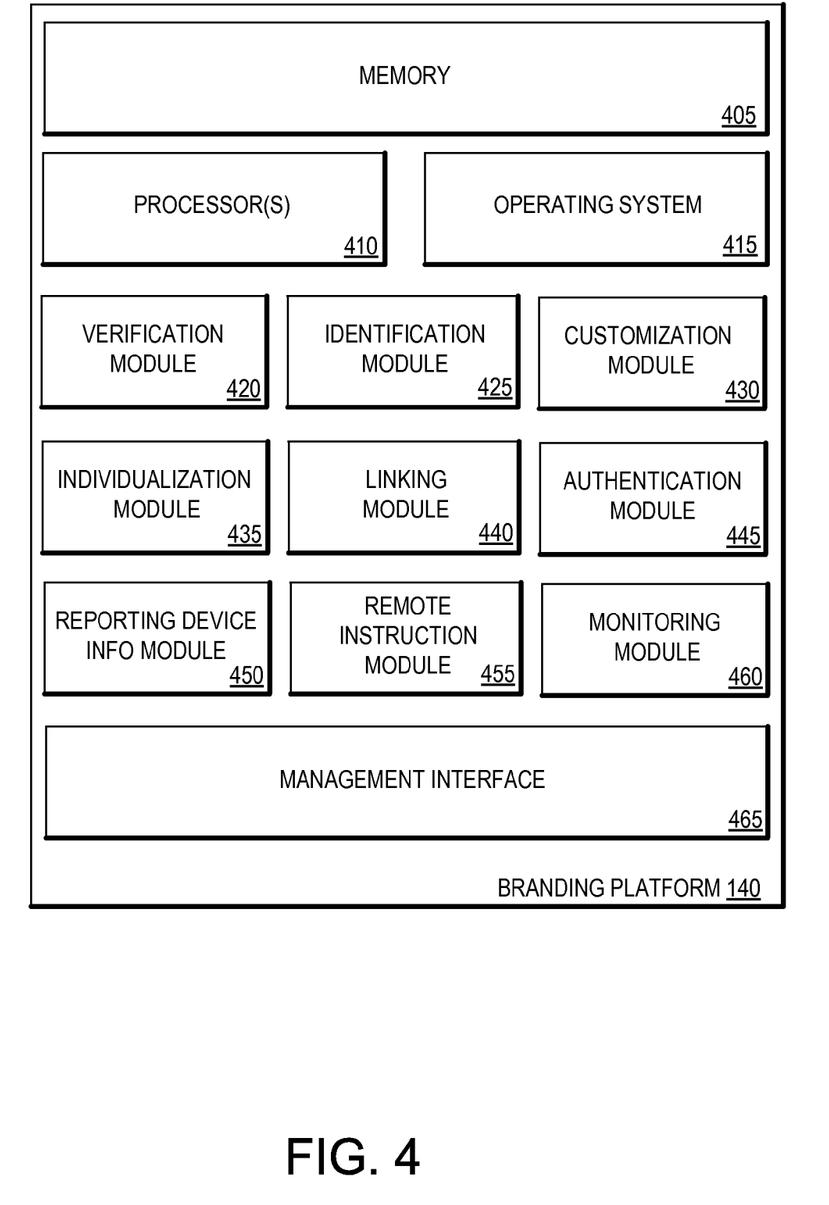
FIG. 4 illustrates a set of components within a branding platform according to one or more embodiments of the present technology.

FIG. 4 illustrates a set of components within branding platform 140 according to one or more embodiments of the present technology. According to the embodiments shown in FIG. 4, branding platform 140 can include memory 405, one or more processors 410, operating system 415, verification module 420, identification module 425, customization module 430, individualization module 435, linking module 440, authentication module 445, reporting device info module 450, remote instruction module 455, monitoring module 460, and management interface 465. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, identification module 430 and customization module 430 can be combined into a single module for customizing a mobile device.

Memory 405 can be any device, mechanism, or populated data structure used for storing information. In accordance with some embodiments of the present technology, memory 405 can encompass any type of, but is not limited to, volatile memory, nonvolatile memory and dynamic memory. For example, memory 405 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 405.

Memory 405 may be used to store instructions for running one or more applications or modules on processor(s) 410. For example, memory 405 could be used in one or more embodiments to house all or some of the instructions needed to execute the functionality of operating system 415, verification module 420, identification module 425, customization module 430, individualization module 435, linking module 440, authentication module 445, reporting device info module 450, remote instruction module 455, monitoring module 460, and/or management interface 465. Operating system 415 provides a software package that is capable of managing the hardware resources of branding platform 140. Operating system 415 can also provide common services for software applications running on processor(s) 410.

Verification module 420 can receive a registration request that includes a bundle of information about a mobile device. The bundle of information can include hash values, digital signatures, MSISDN, International Mobile Station Equipment Identifier (IMEI), Android ID, model, make, operating system, client key, user identifiers, group identifiers, and/or other information to allow the device, network affiliation, user group and user to be verified. In accordance with various embodiments, verification module 420 can verify that the operating system of the mobile device has not been compromised. For example, in some embodiments, the registration request received from the mobile device may include a hash of various files or identifiers (e.g., firmware, chip identifier, etc.). This hash value can be compared against a known value. As another example, the registration request may include a digital signature that can be authenticated. In other cases, a variety of challenge/response protocols to verify the integrity of the mobile device may be used.

Identification module 425 can use the information in the registration request to identify originating device, carrier or MVNO, device group, and/or user. This information can be used by customization module 430 to determine a set of specific aesthetic, functional, and content customizations that should be made to the device. The customizations may be set forth in various customization profiles created by the carrier, user group, and/or user.

In some embodiments, identification module 425 can perform a carrier detection to identify which carrier or MVNO the device should associated with. Then customization module 430 can identify various aesthetic (e.g., visual and audio schemes), functional (e.g., enable/disable certain hardware or software features such as a camera, network configurations, etc.), and content customizations that should be downloaded as set by the carrier or retail store. For example, these customizations can include wallpaper, ring tones, other tones, startup tone, shutdown tone, boot animations, specific applications, network configurations (e.g., SMS configurations, 4G LTE servers, etc.), and the like. In other embodiments, identification module 425 may generate a setup screen where a code can be used to identify which aesthetic, functional, and/or content customizations should be applied. For example a store employee or an end-user may enter such a code.

In addition to the customizations from the carrier or retail store made by customization module 430, individualization module 435 can be used to further customize the mobile device based on a user group or on the individual. For example, if the customer has accessibility needs, then an individual customization profile can indicate that the virtual buttons on the screen can be made bigger. As another example, a user group may be a company or a family. As such, all devices could be associated with each other during this over-the-air configuration process so that email addresses or shared calendars are automatically configured on all devices. Linking module 440 can be used to group the devices for a particular user group. Once the devices are linked, authentication module 445 can be used to generate the group profiles which setup the common content and/or features. Authentication module 445 can also be used to create other profiles including the carrier profile and the individual profile.

Reporting device info module 450 can be used to generate reports about which content and profiles have been installed on which devices. Remote instruction module 455 provides a framework for generating and processing the commands for installing the customized profiles. For example, the framework may include a variety of commands including, but not limited to, download, dialog, install, uninstall, enable, disable, delete, notify, user-defined, clear cache, device status (charge, voice session, data session, screen on, cpu state, etc.), is package installed, launch, mobile data on, reboot, reset ADaPt, set ADB (usb debugging), set APN, set auto date time, set Bluetooth, set data roaming, set GPS, set NFC, set ringer, set tethering, set tone (alarm, ring, notification), set vibrate, set volume, set wallpaper, set WiFi, set WiFi calling, set zen mode, toast, uninstall and the like. These customization commands can be used to cause the mobile device to install the customizations without taking control of the device and enable/disable or otherwise set various features. As such, when a mobile device receives a set of customization commands, the mobile device may access the cloud-based branding platform to retrieve the prescribed profiles (e.g., carrier branding profile designated by the carrier). The customization commands may include aesthetic visual customizations, aesthetic audio customizations, and content customizations used to brand the mobile device according to the branding profile designated by the carrier. Monitoring module 460 can monitor the results of the customizations and identify when one or more of the customization commands have failed to successfully complete.

Management interface 465 can allow various techniques for interacting with the system. For example, management interface 465 may provide various types of customized or generic interface languages or graphical user interface screens to allow for interaction with a user. In at least one embodiment, management interface 465 can allow a user to set preferences, review reports, author customization profiles, set device constraints, and/or otherwise receive or convey information about device customization to the user.

Figure 5:
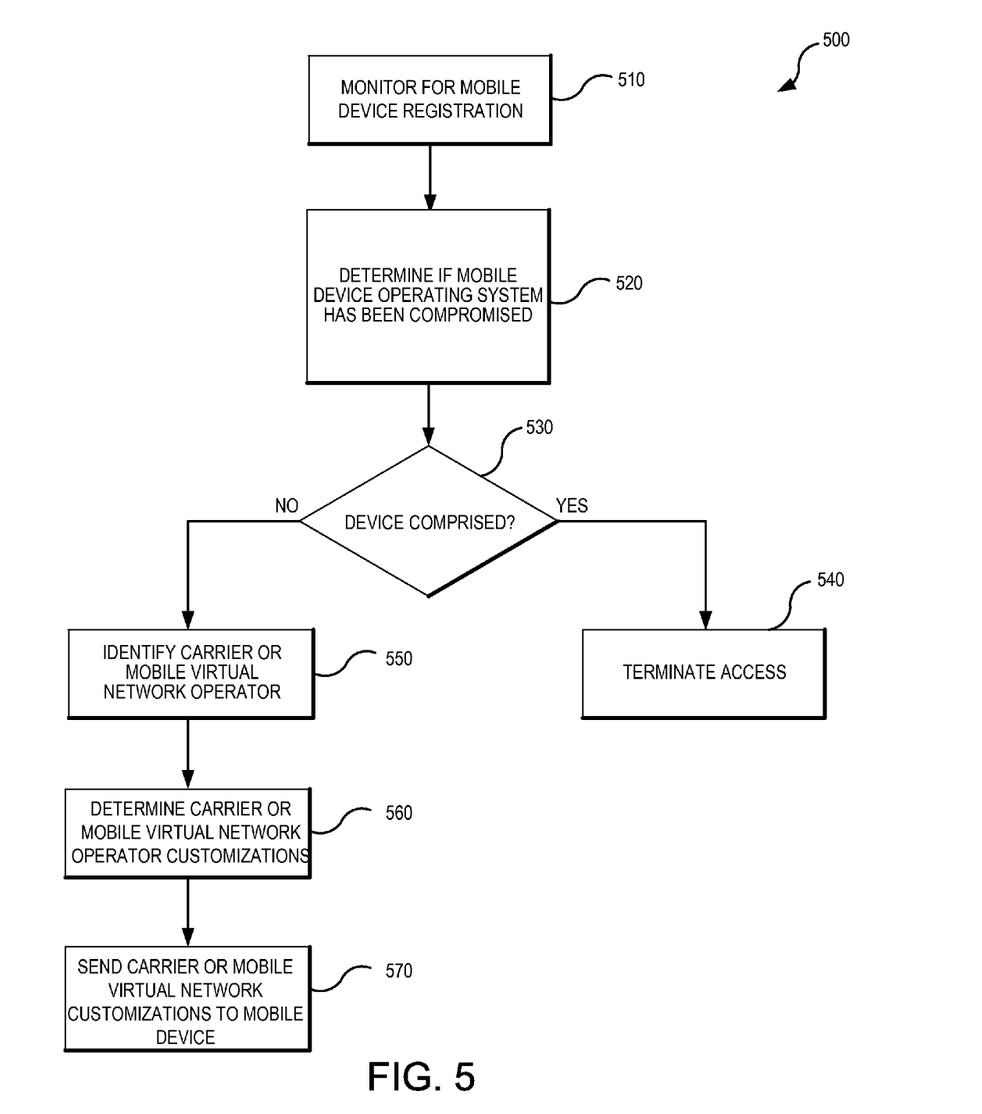
FIG. 5 is a flowchart illustrating a set of operations for operating a branding platform in accordance with some embodiments of the present technology.

FIG. 5 is a flowchart illustrating a set of operations 500 for operating a branding platform in accordance with some embodiments of the present technology. The operations illustrated in FIG. 5 can be performed by branding platform 140 and/or one or more components (e.g., processor(s) 410), engines, and/or modules (e.g., customization module 430) associated with branding platform 140. As illustrated in FIG. 5, monitoring operation 510 monitors for a registration request from a mobile device. The mobile device may be a blank-slate device from an OEM with minimal or no customizations. In accordance with various embodiments, the blank-slate device may have little or no customization done at the factory. Moreover, any of the customizations to be made are to be downloaded from the cloud (e.g., one or more remote servers).

Determination operation 520 then determines if the mobile device operating system has been compromised (e.g., if an Android phone has been rooted or if a jailbreak on an iOS device has occurred). Carriers and/or hardware manufacturers often put limitations or restrictions on their electronic devices. A compromised device is one where the privileges of the user have been escalated and the restrictions or limitations imposed by the carrier and/or hardware manufacturer have been removed or weakened. As a result, an end-user could alter or replace system applications and settings, remove and replace the device's operating system, run specialized apps that require administrator-level permissions, have full theming capabilities, have full control of the CPU, remove pre-loaded applications, or perform other operations that are otherwise inaccessible to a normal user. These types of escalated privileges can result in various security and end-user experience concerns.

Determination operation 520 may use a variety of techniques for detecting a compromised mobile device. For example, the registration request received from the mobile device may include a hash of various files or identifiers (e.g., firmware, chip identifier, etc.). This hash value can be compared against a known value. As another example, the registration request may include a digital signature. In other cases, determination operation 520 may use a variety of challenge/response protocols to verify the integrity of the mobile device. Using the results of determination operation 520, decision operation 530 determines whether the device has been compromised. If decision operation 530 determines that the device has been compromised, then determination operation 520 branches to termination operation 540, where network access to the device is terminated and no customizations are made to the device.

If decision operation 530 determines that the device has not been compromised, then determination operation 520 branches to identification operation 550 where the carrier or mobile virtual network operator is identified. Customization operation 560 determines the customization profile created by the carrier or mobile virtual network operator that should be applied to the new device which can then sent to the device during transmission operation 570. For example, customization operation 560 may send a customization request to a branding platform for an over-the-air customization. The customization request may include a data structure that can be used by the branding platform to identify the appropriate branding profile and then transmit the information to the mobile device where the customizations can be flashed into nonvolatile memory.

In accordance with some embodiments, the customized content is not stored on the mobile device (e.g., on SIM or memory) and all of the customizations are downloaded from the cloud, local computer, or storage device. In one or more embodiments, the desired customizations may be specified on the SIM or other memory but the actual content stored in the branding platform (or a local computer). These specifications for the customization can be included in the data structure that is sent to the branding platform and used to identify the specific content (e.g., applications, wallpaper, etc.) to be returned from the branding platform (or local computer at a store). As such, the OEM may provide the mobile device and a SIM could be installed at the store that has the desired customizations (e.g., MVNO branding, local sports teams, local colleges, etc.).

Figure 6:
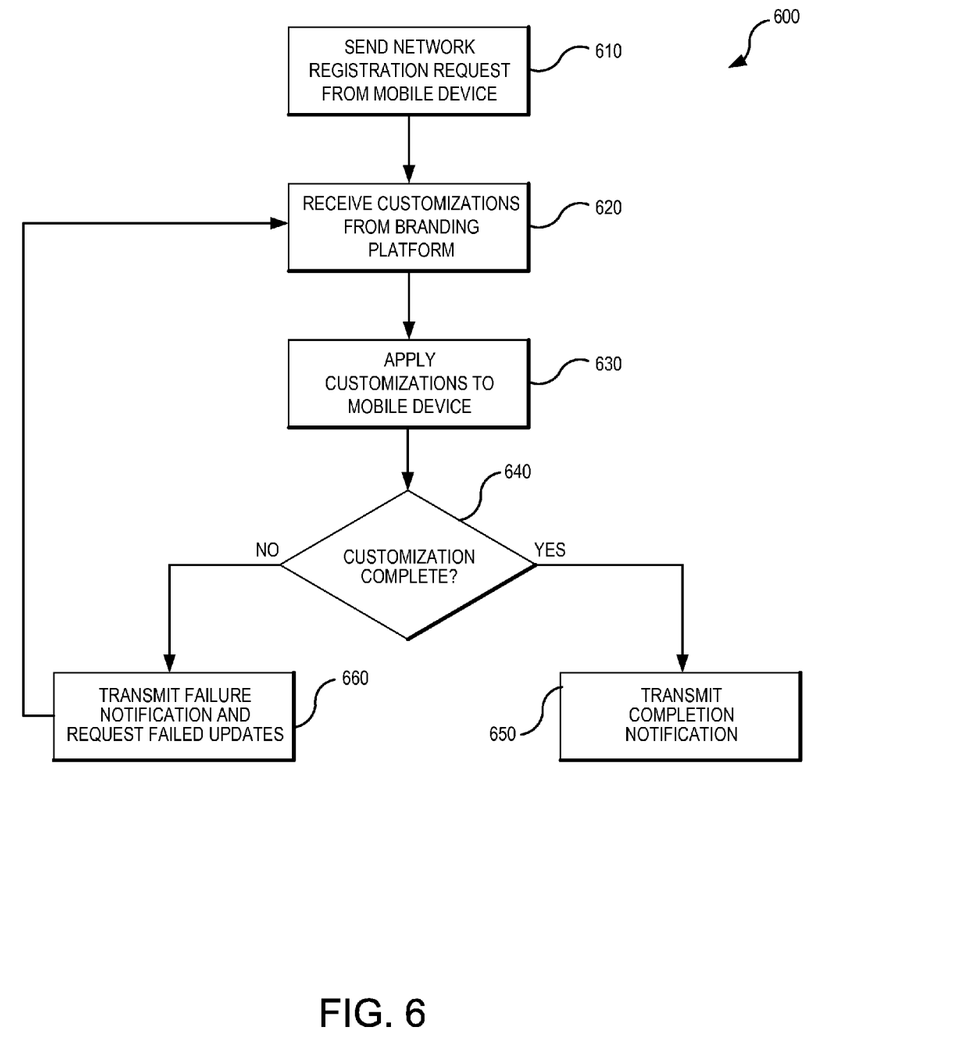
FIG. 6 is flowchart illustrating a set of operations for customizing a mobile device in accordance with one or more embodiments of the present technology.

FIG. 6 is flowchart illustrating a set of operations 600 for customizing a mobile device in accordance with one or more embodiments of the present technology. The operations illustrated in FIG. 6 can be performed by a mobile device or one or more components (e.g., processor(s) 315), engines, and/or modules associated with the mobile device. As illustrated in FIG. 6, registration operation 610 sends a network registration request from the mobile device. The mobile device can receive for a set of customizations (e.g., aesthetic visual or audio profiles) from a branding platform during receiving operation 620.

The customizations may be provided to the mobile device using a set of customization framework commands. These commands may direct the phone to download and install certain files (e.g., ringtones, wallpaper, etc.). In some embodiments, these customization commands may even prompt the user to determine if the user is interested in certain applications and/or content. For example, a carrier or mobile virtual network operator may be willing to provide a movie or song to the user. The user is prompted to indicate if they are interested in such a customization. If the user indicates they are interested, then the content can be downloaded. If the user indicates they are not interested, then the content will not be downloaded. This allows the carrier or mobile virtual network operator to only pay for licenses that are needed to provide the user content of interest.

Application operation 630 applies the customizations to the mobile device. The customization process may be monitored (locally or remotely) to ensure successful completion. Completion operation 640 determines if the customization is complete. If completion operation 640 determines the customization was successfully completed, then completion operation 640 branches to transmission operation 650 where a completion notification is sent to branding platform 140. If completion operation 640 determines the customization was not successfully completed, then completion operation 640 branches to failure operation 660 where a failure notification is sent and a request to reload the failed updates is sent to branding platform 140.

Figure 7:
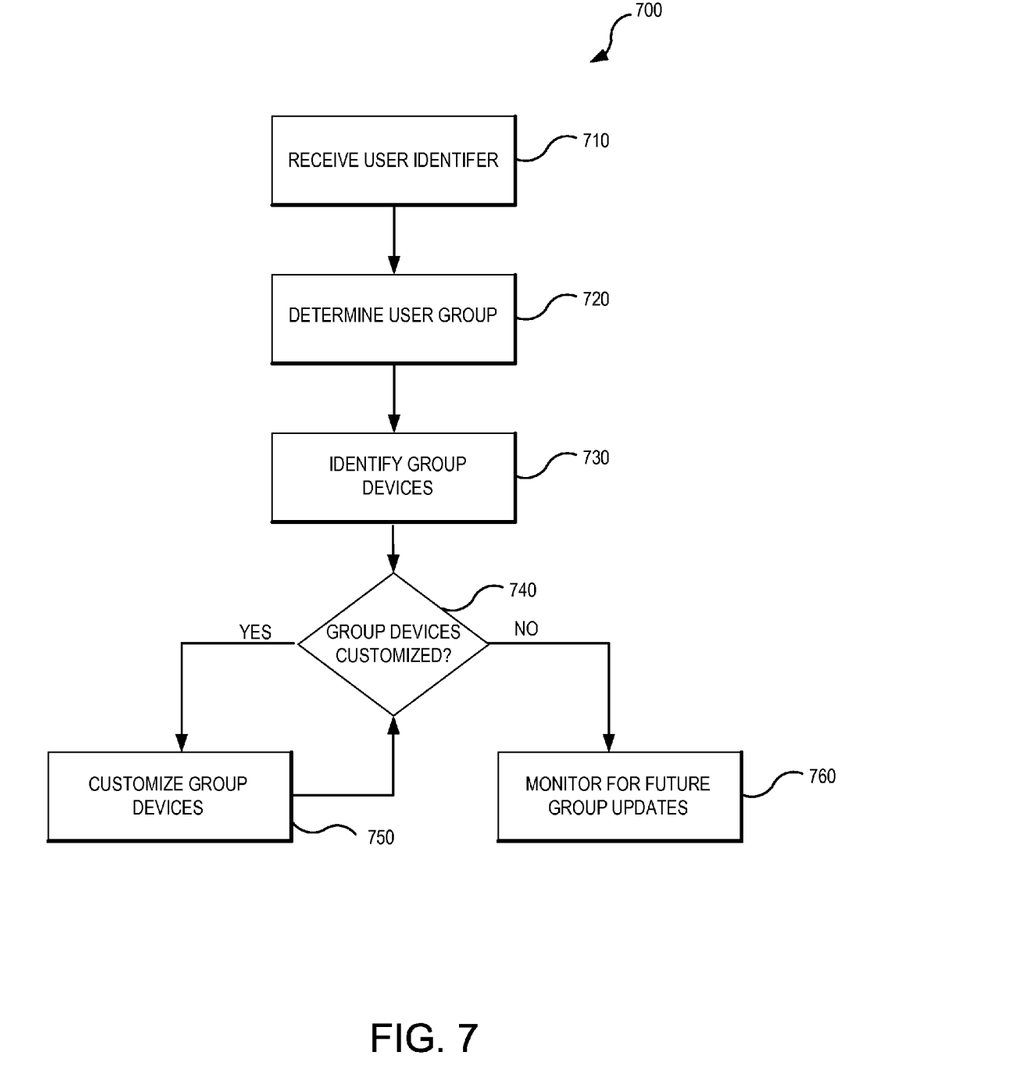
FIG. 7 is a flowchart illustrating a set of operations customizing groups of devices in accordance with some embodiments of the present technology.

FIG. 7 is a flowchart illustrating a set of operations 700 customizing groups of devices in accordance with some embodiments of the present technology. As illustrated in FIG. 7, receiving operation 710 receives a user identifier. The user identifier may identify the user, the user's device, and any groups (e.g., company, family, etc.) that should be associated with the user. Using the user identifier, grouping operation 720 can determine the user group. For example customization module 430, can queries customization database 150 based on a received user ID or other identifier, to find the corresponding user group and the branding or customization associated with that group.

Identification operation 730 may be an optional operation that that can identify the devices associated with the user group when the user identifier cannot be associated with a particular device. Customization operation 740 determines if the group devices have any customizations (e.g., specific applications, functionality restrictions, etc.). If customization operation 740 determines that a group customization is required, then customization operation 740 branches to application operation 750 where the group devices are customized until no further customizations are needed. If customization operation 740 determines that no group customizations are required, then customization operation 740 branches to monitor operation 760 where the future group updates are monitored and pushed to the group devices. Note, operations of FIGS. 5-7 could be performed relatively concurrently.

Figure 8:
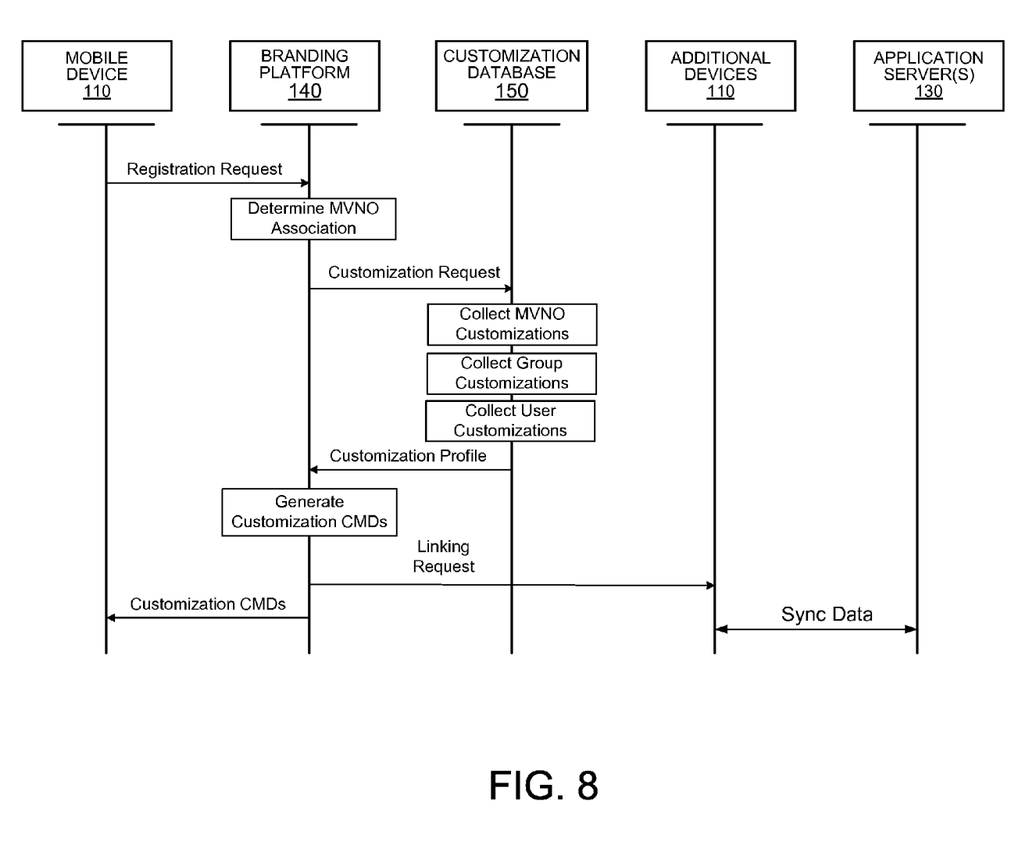
FIG. 8 is a sequence diagram illustrating an example of the data flow between various components of a communications system according to various embodiments of the present technology.

FIG. 8 is a sequence diagram illustrating an example of the data flow between various components of a communications system according to various embodiments of the present technology. As illustrated in FIG. 8, the mobile device 110 may send a registration request to the branding platform 140. Branding platform 140 can then determine the carrier or MVNO associated with the mobile device. Using this information, branding platform 140 can generate a customization request to customization database 150. The customizations can include the carrier or MVNO customizations, group customizations, and/or user customizations. A customization profile can then be returned to the branding platform which can generate customization commands and linking requests. The customization commands are sent to the mobile device which is then updated accordingly.

Linking requests can be sent to additional mobile devices 110 to ensure common applications (e.g., a family calendar, photo sharing applications, etc.) are installed and configured. These applications can then sync data using one or more application servers 130. For example, in some embodiments, when a device is associated with a user group, the group customizing profiles may identify applications and settings for those applications that the group would like to use. As such, calendar applications can be installed and automatically configured to show the group calendar.

In some embodiments, the mobile device may not include any type of cellular communication capabilities. For example, some types of tablet devices do not include any type of cellular communication capabilities, but instead use various types of hardware to access the Internet (e.g., a Wi-Fi device). As such, the mobile device may use various IP protocols to download content from and/or transmit messages to the branding platform via the Internet (e.g., via a webpage or web-interface). In accordance with some embodiments, a default or preferred type of access may be set and if the mobile device cannot access the branding platform based on that preference (e.g., a Wi-Fi only device, a poor cellular network connection, etc.) the mobile device will switch to the alternate access type.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application to pursue such additional claim forms, in either this application or in a continuing application.

What is claimed is:

1. A method for branding a mobile device, the method comprising:
   at the mobile device, generating and transmitting a registration request upon activation of the mobile device,
      wherein the mobile device is authorized to be used on a first telecommunications network associated with a wireless telecommunications carrier;
      wherein the mobile device is either
         a blank-slate device that is not branded according to the wireless telecommunications carrier preferences from a factory, or
         has installed a default user experience associated with a default preference according to the wireless telecommunications carrier; and
      wherein the registration request contains information to be used by a cloud-based branding platform to select a branding profile from multiple branding profiles;
         wherein each of the multiple branding profile are used to access branding data in a database;
         wherein the branding data stored in the database includes aesthetic visual customizations, aesthetic audio customizations, and content customizations used to brand mobile devices;
         wherein the branding platform or database is accessible to outside parties other than the wireless telecommunications carrier; and
         wherein the outside parties can customize or designate branding profiles or branding data to be used for the mobile device;
   at the mobile device, and based on the transmitted registration request, receiving the branding profile selected by the branding platform,
      wherein the branding profile is associated with aesthetic visual customizations, aesthetic audio customizations, and content customizations used to brand the mobile device according to the branding profile designated by or provided by an outside party; and
   at the mobile device, transmitting messages based on the branding profile to the cloud-based branding platform to download to the mobile device the associated aesthetic visual customizations, aesthetic audio customizations, and content customizations.

2. The method of claim 1, wherein the outside party is a mobile virtual network operator and the branding profile is designated by the mobile virtual network operator.

3. The method of claim 1, wherein the aesthetic visual customizations include splash screens, boot animations, logos, wallpaper, and background colors, the aesthetic audio customizations include startup sounds and ringtones, and the content customization includes applications.

4. The method of claim 1, further comprising:
   determining whether an operating system of the mobile device has been compromised; and terminating access to the cloud-based branding platform when a determination has been made that the operating system of the mobile device has been compromised.

5. The method of claim 1, further comprising:
receiving a set of customization commands allowing the mobile device to access the cloud-based branding platform to retrieve the branding profile,
wherein the set of customization commands are supported by a modification framework and include multiple steps, and
determining if each of the multiple steps have been completed and transmitting a request to the cloud-based branding platform to complete any uncompleted steps.

6. The method of claim 1, wherein the cloud-based branding platform supports a modification framework to make remote modifications to the mobile device and wherein the remote modifications include multiple steps.

7. The method of claim 1, further comprising receiving group customizations to further customize the mobile device based on a group profile.

8. A branding platform comprising:
a processor;
memory coupled to the processor;
a database stored in the memory and having stored thereon multiple customization profiles,
wherein the customization profiles include aesthetic, content, feature customizations set by a mobile virtual network operator;
wherein the mobile virtual network operator is a reseller of network services from a wireless telecommunications service provider; and
wherein the mobile virtual network operator does not itself own wireless telecommunication network infrastructure equipment;
an identification module comprised of processor-implementable software instructions stored in the memory and configured to
receive a registration request generated upon an activation of a mobile device; and
identify the mobile virtual network operator, associated with the mobile device, based on information within the registration request; and,
a customization module comprised of processor-implementable software instructions stored in the memory and configured to
retrieve, from the database, one of the customization profiles that is associated with the mobile virtual network operator identified by the identification module; and
generate or provide a set of customizations based on the customization profile,
wherein the set of customizations can be automatically downloaded and installed by the mobile device.

9. The branding platform of claim 8, further comprising an authentication module comprised of processor-implementable software instructions stored in the memory to create the customization profiles stored on the database.

10. The branding platform of claim 8, further comprising a verification module comprised of processor-implementable software instructions stored in the memory and configured to determine the operating system integrity and terminate a connection with the mobile device when the operating system integrity has been compromised.

11. The branding platform of claim 8, wherein the customization module comprised of processor-implementable software instructions stored in the memory is further configured to:
identify a user group associated with the mobile device; and
retrieve a group customization profile associated with the user group from the database.

12. The branding platform of claim 8, wherein each of the customization profiles include aesthetic visual customizations, aesthetic audio customizations, and content customizations.

13. A non-transitory computer-readable medium, excluding transitory signals, storing instructions that when executed by one or more processors cause a machine to:
receive a registration request generated upon activation of a mobile device, wherein the mobile device is a generic device that is not branded;
identify a branding profile to be applied to the mobile device from a selection of multiple different branding profiles;
generate a set of customization commands allowing the mobile device to access the branding platform to retrieve the branding profile,
wherein the branding platform or a database of branding content is accessible to outside parties other than the wireless telecommunications carrier;
wherein the outside parties can customize or designate the branding profile or branding content to be used with the mobile device; and
wherein the set of customization commands include aesthetic visual customizations, aesthetic audio customizations, and content customizations used to brand the mobile device according to the branding profile; and
receive a request to download content associated with the aesthetic visual customizations, aesthetic audio customizations, and content customizations to the mobile device; and
transmit the content to the mobile device.

14. The non-transitory computer-readable medium of claim 13, wherein the mobile device includes cellular communications capable of connection with a carrier that is a mobile virtual network operator and the branding profile is designated by the mobile virtual network operator, and wherein the mobile device is authorized to be used on a first network associated with the carrier.

15. The non-transitory computer-readable medium of claim 13, wherein the mobile device does not include cellular communications capabilities and the aesthetic visual customizations include splash screens, boot animations, logos, wallpaper, and background colors, the aesthetic audio customizations include startup sounds and ringtones, and the content customization includes applications.

16. The non-transitory computer-readable medium of claim 13, further comprising:
generate a set of group customization commands allowing the mobile device to access the branding platform to retrieve a group customization profile; and
receive a request to download group content associated with the group customization profile, and
wherein the group customization profile disables a hardware function of the mobile device.

17. The non-transitory computer-readable medium of claim 13, further comprising:

generate a set of group customization commands allowing the mobile device to access the branding platform to retrieve a group customization profile; and receive a request to download group content associated with the group customization profile.

18. The non-transitory computer-readable medium of claim 13, further comprising:

generate a set of individual customization commands allowing the mobile device to access the branding platform to retrieve an individual customization profile, receive a request to download individual content associated with the individual customization profile, and wherein the individual customization profile changes the size of text and icons on the mobile device to permit a user to easily see the text and icons.

19. The non-transitory computer-readable medium of claim 13, further comprising:

generate a set of individual customization commands allowing the mobile device to access the branding platform to retrieve an individual customization profile, receive a request to download individual content associated with the individual customization profile.

\* \* \* \* \*